United States Patent [19]

LeBlond et al.

[11] Patent Number: 4,634,189

[45] Date of Patent: Jan. 6, 1987

[54] WHEEL HUB INCLUDING STRUCTURE FOR ATTACHMENT OF ACCESSORIES

[75] Inventors: Charles E. LeBlond; Henri LeBlond, both of St. Bruno, Canada

[73] Assignee: Hamelin Industries, Inc., Warsaw, Ind.

[21] Appl. No.: 694,953

[22] Filed: Jan. 24, 1985

Related U.S. Application Data

[63] Continuation-in-part of Ser. No. 393,069, Jun. 28, 1982, Pat. No. 4,508,392.

[51] Int. Cl.$^4$ .............................................. B60B 5/02
[52] U.S. Cl. ............................. 301/63 PW; 301/6 V; 301/105 B
[58] Field of Search .......... 301/63 PW, 105 R, 105 B, 301/6 V; 192/6 R, 6 A, 6 B, 7

[56] References Cited

U.S. PATENT DOCUMENTS

| | | | |
|---|---|---|---|
| 992,713 | 5/1911 | Gilman | 308/190 |
| 1,968,586 | 7/1934 | Apple | 301/105 R X |
| 1,968,588 | 7/1934 | Apple | 301/105 R X |
| 2,083,188 | 6/1937 | Baldwin | 301/5.7 |
| 2,136,531 | 11/1938 | Vogt | 301/5.7 |
| 2,670,242 | 2/1954 | Beckman | 301/5.7 |
| 3,256,964 | 6/1966 | Dotter | 301/105 B X |
| 3,730,594 | 5/1973 | Zbikowski | 301/63 PW |
| 4,280,736 | 7/1981 | Raudman | 301/63 PW X |
| 4,294,491 | 10/1981 | Black | 301/105 R X |
| 4,330,914 | 5/1982 | Hood | 301/105 R |
| 4,351,569 | 9/1982 | Steuer et al. | 301/6 V |
| 4,405,179 | 9/1983 | Boudreau | 301/63 PW X |

FOREIGN PATENT DOCUMENTS

1180939 6/1959 France .......................... 301/105 R

Primary Examiner—David A. Scherbel
Attorney, Agent, or Firm—Trexler, Bushnell & Wolters, Ltd.

[57] ABSTRACT

A wheel hub includes an improved structure for mounting at least one accessory thereto, the wheel hub has a hollow cylindrical body having a radially acting coupling arrangement including a plurality of alternating recesses and ridges formed interiorly of the hollow body for complementary engagement with a portion of the accessory for rotation in unison with the wheel hub. An axially acting coupling arrangement is also provided for holding the accessory substantially against axially movement relative to the wheel hub.

17 Claims, 20 Drawing Figures

WHEEL HUB INCLUDING STRUCTURE FOR ATTACHMENT OF ACCESSORIES

This application is a continuation-in-part of copending application Ser. No. 393,069 filed June 28, 1982, now U.S. Pat. No. 4,508,392.

BACKGROUND OF THE INVENTION

The present invention is directed generally to improvement in a wheel hub and in particular to an improved wheel hub structure for receiving an accessory mounted thereto. Another aspect of the invention is directed to novel cooperating structure provided on both a wheel hub and an accessory to facilitate the mounting of the accessory to the wheel hub.

Wheels for tricycles, bicycles or exercise cycles generally comprise a central hub and a plurality of spokes or other means coupling the hub to a rim for mounting a suitable tire or the like. Heretofore many such wheels have been constructed primarily of metallic materials, requiring that rim, hub and spokes be separately constructed and assembled. To save significantly on the cost of such wheels, various molded plastic one-piece wheels have been proposed. Generally speaking, in such structures hub, spokes and rim are molded in a single molding operation.

However, in the aforementioned applications (bicycles, etc.) various accessories must also be coupled to one or more of the wheels, and in particular to the wheel hubs. In this regard, bicycles or the like require some drive means such as a chain driven sprocket, or alternatively, a braking mechanism, such as a coaster brake, both of which are commonly mounted to the wheel hub. Additionally, great savings are realized if the interior hub diameter of all such molded one-piece wheel structures are fixed, and a separate bushing or the like is inserted to accommodate this diameter to a given axle.

From the foregoing, it will be seen that the coupling of the desired sprocket, brake or crank to a wheel hub requires some additional parts and assembly. In the case of a one-piece molded wheel structure, the economies realized in provision of the structure may rapidly be lost in the modifications, assembly steps and extra parts required to mount such accessories to the hub.

OBJECTS AND SUMMARY OF THE INVENTION

It is a general object of the invention to provide a wheel hub including improved structure for mounting at least one accessory thereto.

A more specific object is to provide a wheel hub structure for mounting a coaster brake within a wheel hub.

Briefly, and in accordance with the foregoing objects, a wheel hub in accordance with the invention comprises a hollow cylindrical body; radially acting coupling means including a plurality of alternating recesses and ridges formed interiorly of said hollow body for complementary engagement with a portion of said accessory for rotation in unison with said wheel hub; and axially acting coupling means for holding said accessory substantially against axial movement relative to said wheel hub.

BRIEF DESCRIPTION OF THE DRAWINGS

The foregoing, as well as other objects, features and advantages of the invention will be more readily appreciated upon reading the following detailed description of the illustrated embodiment, together with reference to the drawings, wherein.

DETAILED DESCRIPTION OF THE ILLUSTRATED EMBODIMENT

Figure 1:
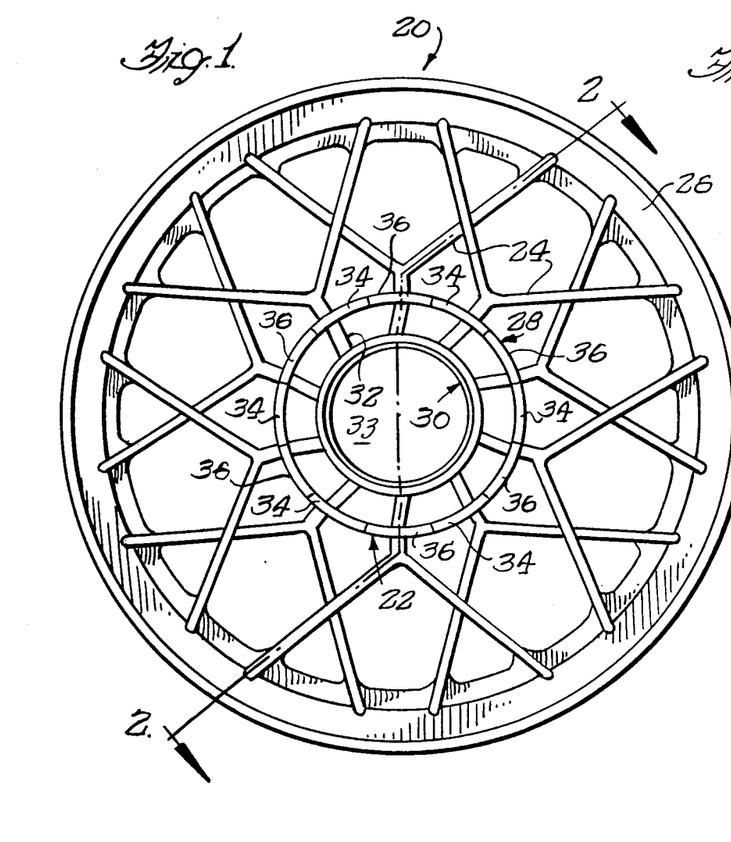
FIG. 1 is a side elevation of an exemplary one-piece molded plastic wheel provided with a hub portion in accordance with one aspect of the invention.
Figures 2, 3:
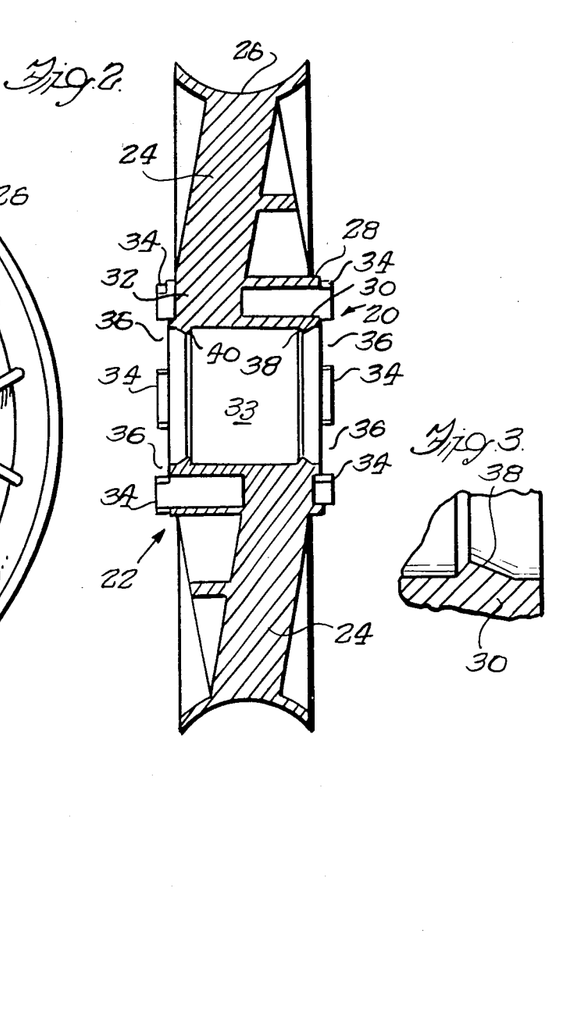
FIG. 2 is a developmental view taken generally along the line 2—2 of FIG. 1.
FIG. 3 is an enlarged view of a portion of FIG. 2.

Referring now to the drawings and initially to FIGS. 1 and 2 an exemplary wheel embodying the present invention is designated generally by the reference numeral 20. The wheel 20 is preferably integrally molded of suitable plastics material. Generally speaking, the wheel 20 includes a central hub portion designated generally by reference numeral 22 from which radiate a plurality of generally Y-shaped spokes 24. These spokes 24, as best viewed in FIGS. 2, radiate from alternate sides of the hub portion 22 about the periphery thereof. The outer peripheral ends of the respective spokes 24 are coupled with a rim 26 which may be shaped to receive a suitable tire, as best viewed in FIG. 2.

In the illustrated embodiment, the central hub portion 22 comprises an outer rim 28 and an inner rim 30. Intermediate these two rims 28 and 30 are a plurality of secondary spokes 32, which like the spokes 24 alternate between front and back sides of the hub 22 and radiate toward respective adjacent ones of the primary spokes 24. The outer rim 28 and the secondary spokes 32 may be eliminated, leaving a single rim 30 from which the primary spokes 24 radiate directly, without departing from the invention.

The inner rim 30 of the hub portion 22 defines a substantially cylindrical through opening 33 for receiving a suitable axle or other components, whereby the wheel 20 may be utilized as a wheel for a bicycle, tricycle, exercise cycle or the like.

In accordance with a feature of the invention, the hub outer rim 28 includes a plurality of radially spaced, axially outwardly extending surfaces or ridges 34. Intermediate the respective ridges 34 are defined a plurality of axially inwardly recessed recesses or slots 36. In accordance with a preferred form of the invention, each of the raised surfaces or ridges 34 and recesses or slots 36 subtends substantially the same degree of arc about the periphery of the hub outer rim 28. Moreover, the ridges 34 and slots 36 are substantially symmetrically formed, and each is the same height or depth throughout its respective arc.

It will be recognized that these alternating ridges and slots 34, 36 may be of any convenient number, size and disposition, without departing from the invention. However, the symmetrical arrangement illustrated is preferred. As will be seen later the recesses 36 receive similar projecting parts on a plate, sprocket wheel or other accessory to be coupled for rotation in unison with the wheel 20 according to the invention. By providing the illustrated and described symmetrical arrangement of these alternating slots and ridges 36, 34, the manufacture of mating components and the assembly thereof is greatly simplified.

In accordance with another feature of the invention, the opening 33 defined by the inner rim 30 includes, near the axial outer extremities thereof, a generally inwardly converging, annular tooth or shoulder portion 38, 40. A cross-sectional view of the inwardly projecting annular shoulder or tooth 38 is best viewed in FIG. 3, to which reference is also invited.

These inwardly converging annular shoulders 38, 40 snappingly engage with mating annular recesses on components to be coupled to the hub. As will be seen later, this coupling holds the accessory against axial movement, discouraging disassembly thereof in the axial direction.

However, the projections 38 and 40 need not take the form illustrated and described herein. For example, any inwardly projecting surface whether a continuous annular surface or a plurality of independent projections may be considered an equivalent structure and hence falls within the scope of the invention. The preferred form illustrated is believed simpler to form in a molding process. Moreover, this preferred form facilitates the manufacture of a mating accessory and its assembly therewith.

Having thus described a preferred embodiment of a molded wheel in accordance with the invention, a number of exemplary mating components or accessories and their assembly therewith will now be described.

Figure 4:
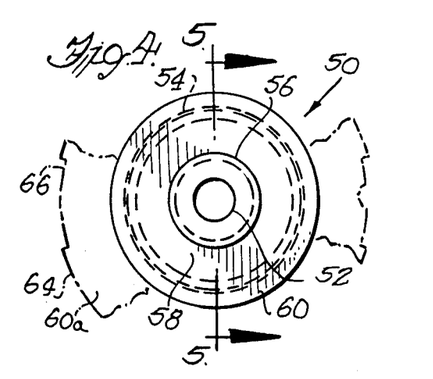
FIG. 4 is a side elevation of a hub bushing useful with the wheel of FIGS. 1 and 2.
Figure 5:
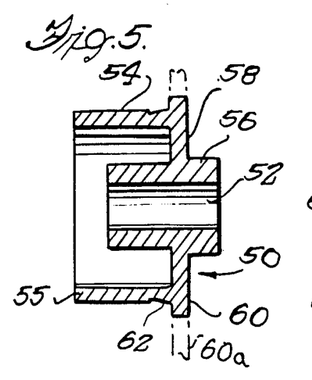
FIG. 5 is a sectional view taken generally along the line 5—5 of FIG. 4.

Referring initially to FIG. 4 and FIG. 5, a bushing 50 suitable for use in adapting the hub 22 to receive a shaft or axle therethrough is illustrated. This bushing 50 defines an inner diameter 52 for receiving a shaft or axle therethrough and an outer diameter 54 substantially similar to the inner diameter of the inner hub portion or rim 30. As best seen in FIG. 5, the inner diameter 52 is defined by a first or inner tubular portion 56 while the outer diameter 54 is defined by a second or outer tubular portion 55 of the bushing 50. A generally annular web member or portion 58 joins the inner and outer tubular portions 55, 56 of the bushing 50.

Additionally, this annular web portion 58 extends radially outwardly to define flange portion 60. This flange portion 60 is of somewhat greater diameter than the outer diameter of the inner rim 30 of the hub 22. Immediately axially inwardly of this flange portion 60 is an annular recess or groove 62 which is substantially complementary with the annular projections 38, 40 of the hub 22. Accordingly, as will be seen later, the bushing 50 may be easily engaged with the hub 22 by axially advancing the bushing until the complementary annular parts 62 and 38 or 40, respectively, interengage. In accordance with an alternate embodiment, as shown in phantom line in FIG. 4 and FIG. 5, the flange portion 60 may extend radially outwardly at 60a to terminate in a plurality of radially outwardly extending ridges 64 and alternating recesses 66 for interengagement with the ridges and recesses 34, 36 of the hub outer rim portion 28.

Figure 6:
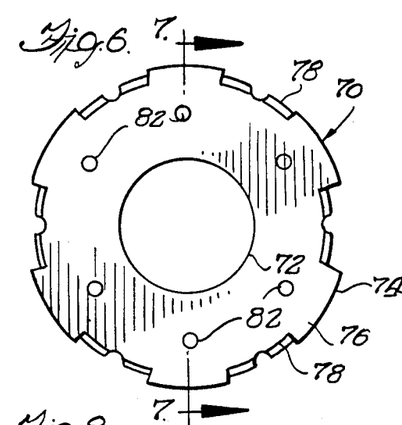
FIG. 6 is a side elevation of a coaster brake adapter plate which may be used with the wheels of FIGS. 1 and 2.
Figure 7:
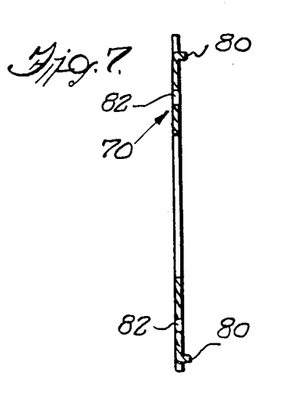
FIG. 7 is a sectional view taken generally along the line 7—7 of FIG. 6.

Referring now to FIG. 6 and FIG. 7, a coaster brake adapter plate is indicated generally by the reference numeral 70. This coaster brake adapter plate preferably comprises a metallic plate member having a generally circular through opening 72 and an outer periphery 74 of similar diameter to the outer diameter of the hub outer rim portion 28. Cooperatively, this outer rim portion 74 defines a complementary plurality of alternating radially outwardly projecting parts 76 and recesses 78 for interengagement with the projections and recesses 34, 36 of the hub outer rim portion 28.

In the illustrated embodiment, each of the recessed portions 78 of the adapter plate 70 is also provided with an axially inwardly projecting or bent-over portion 80. Preferably, these portions 80 define a diameter substantially similar to the inner diameter of the rim 28 for frictional engagement therewith. In the illustrated embodiment, the adapter plate 70 also includes a plurality of mounting apertures 82 therethrough for receiving suitable fasteners or the like for engagement with mating bores, as will be seen later with reference to FIGS. 15 and 16 of the wheel hub 22. In this regard, one such adapter plate 70 is preferably utilized at either axial end of the hub 22 and held against disengagement in the axial direction by either a frictional fit as described or by suitable fasteners through the respective openings 82.

Figure 8:
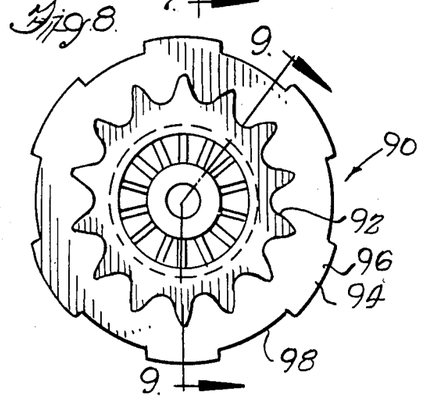
FIG. 8 is a side elevation of a sprocket which may be used with the wheel of FIGS. 1 and 2.
Figure 9:
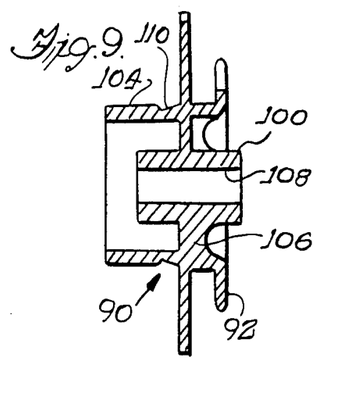
FIG. 9 is a developmental view taken along the line 9—9 of FIG. 8.

Referring next to FIG. 8 and FIG. 9, a sprocket wheel, preferably of a suitable plastics material is indicated generally by the reference numeral 90. This sprocket wheel 90 includes a conventional sprocket portion 92 for engagement with a chain drive or the like. This sprocket portion 92 projects somewhat axially outwardly of an integrally formed circular plate portion 94. Cooperatively, the circular plate 94 is formed with a plurality of alternating radially outwardly projecting parts 96 and inwardly recessed parts 98 for interengagement with the projections and recesses 34, 36 of the hub outer rim portion 28.

Figure 10:
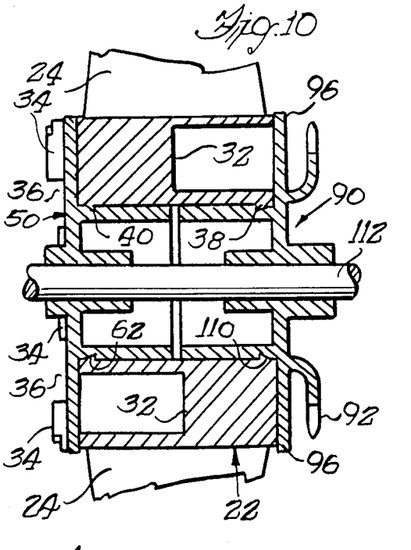
FIG. 10 is an enlarged view of a central hub portion of the wheel of FIGS. 1 and 2 illustrating the attachment thereto of a sprocket of the type shown in FIGS. 8 and 9 and of a bushing of the type shown in FIGS. 4 and 5.
Figure 11:
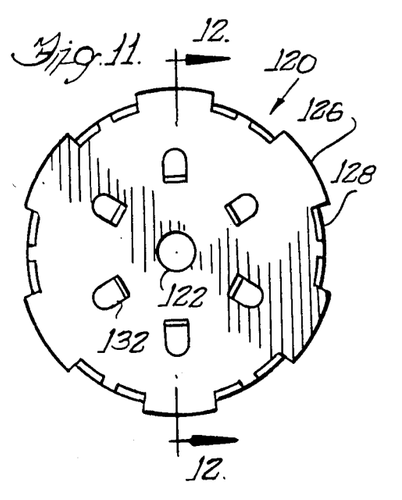
FIG. 11 is a crank retainer plate which may be utilized with the wheels of FIGS. 1 and 2.

Additionally, the sprocket wheel member 90 includes an inner tubular portion 100 and an outer tubular portion 104 joined by a suitable annular web portion 106. This latter structure is all substantially similar to that shown and described with reference to the bushing 50 of FIG. 4 and FIG. 5. Accordingly, the inner tubular portion 100 defines a substantially similar inner diameter 108 to the inner diameter 52 of a bushing to be associated with the same wheel 20, as shown for example in FIG. 10.

Additionally, the outer tubular portion 104 includes an annular recessed portion or groove 110 which is complementary with the inwardly projecting annular parts 38, 40 of the hub 22. Accordingly, as best viewed in FIG. 10 a typical sprocket assembly including a sprocket member 90 and a bushing member 50 may readily be assembled to the opposing faces of the hub 22 and a suitable shaft or axle 112 mounted therethrough.

Referring next to FIGS. 11 through 14, inclusive, a crank adapter plate, indicated generally by the reference numeral 120, and its mounting with a typical crank assembly to a wheel hub 22a, substantially similar to the wheel hub 22 of FIGS. 1 and 2, is illustrated. The crank adapter plate 120 is substantially similar to the coaster brake adapter plate 70 of FIG. 6 and FIG. 7. However, a central through aperture 122 thereof is of similar diameter to the outer diameter of a crank shaft 124 (see FIG. 14) to be recieved therethrough. The crank adapter plate 120 is provided with similar peripheral radially outwardly projecting and inwardly recessed parts 126, 128 for engagement with the projections and recesses 34, 36 of the hub outer rim portion 28. Additionally, the inwardly recessed portions 128 are provided with axially projecting parts 130 for frictional engagement with the inner diameter of the rim 28.

Figures 12, 13, 14:
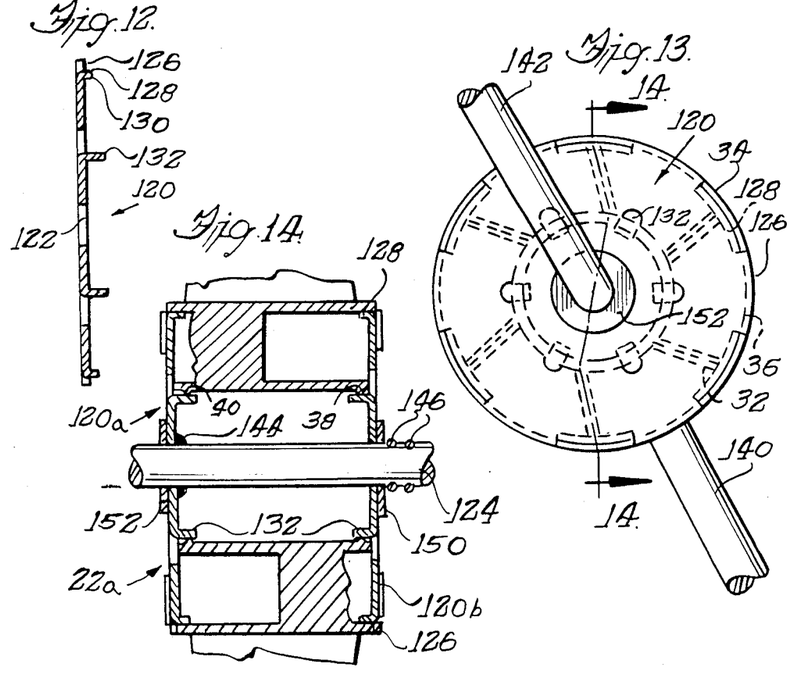
FIG. 12 is a sectional view taken along the line 12—12 of FIG. 11.
FIG. 13 is a side elevation of a crank assembly including a pair of crank adapter plates as shown in FIGS. 11 and 12 assembled with a wheel similar to the wheel of FIGS. 1 and 2.
FIG. 14 is a developmental view taken generally along the line 14—14 of FIG. 13.

In accordance with the embodiment illustrated in FIGS. 11 through 14, the crank adapter plate 120 is also provided with a plurality of axially inwardly projecting cut-out portions 132 which define a diameter substantially similar to the inner diameter of the hub inner rim portion 30. Hence, these projections 132 preferably frictionally engage the inner surface of the rim 30 as best seen in FIG. 14.

As viewed in FIG. 13 and FIG. 14, a typical crank assembly includes the crank shaft 124 which is preferably bent at substantially 90° at axially outermost ends thereof to form a pair of radially outwardly extending cranks 140, 142. Suitable cranks 140, 142 may also be provided as separate parts for attachment by suitable means to the axially outer ends of the crank shaft 124.

The crank shaft 124 is preferably preassembled with one crank adapter plate member 120a by a suitable weldment 144 at an inner face thereof to which the plate 120a is assembled as indicated in FIG. 14. Thereupon a second, similar crank adapter plate 120b, is engaged over the axially opposite end of the crank shaft 124 and coupled in the same fashion with the hub 22a. Suitable weldments 146 or other means are utilized to axially engage this remaining end of crank shaft 124 with the plate 120b. In the illustrated embodiment suitable washers 150, 152 are interposed about either outer face of the respective plates 120a, 120b to enhance the rigidity and structural integrity of the assembly illustrated in FIG. 14.

Figure 15:
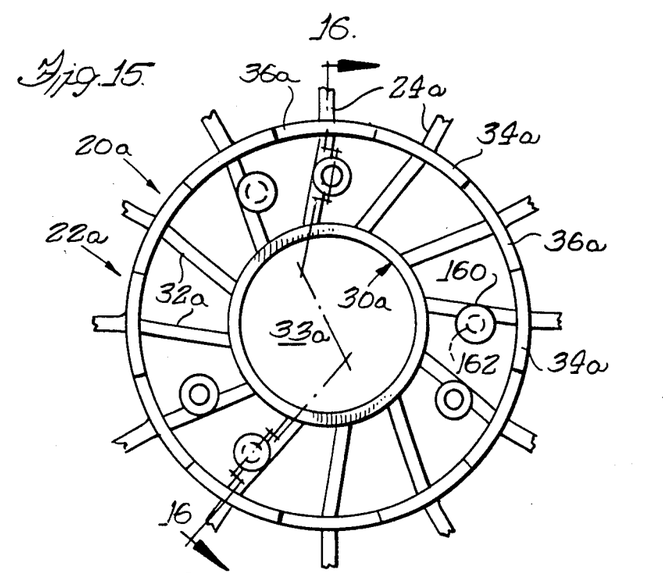
FIG. 15 is a side elevation of a second embodiment of the hub portion of a wheel similar to FIG. 1.

Reference is next invited to FIG. 15 which illustrates an alternate embodiment of the central hub portion 22a of a wheel 20a which is similar to the wheel 20 of FIGS. 1 and 2. In this regard, corresponding parts of the wheel hub 22a have been indicated by the same reference numerals used in FIG. 1 and FIG. 2, followed by the suffix a. However, the central hub portion 22a of FIG. 15 includes twelve inner spokes 32a and hence twelve corresponding outer spokes 24a. Similarly, the raised and lowered rim portions 34a and 36a are each six in number. In all other respects, this wheel 20a and central hub portion 22a are substantially identical to the wheel 20 shown in FIGS. 1 and 2.

Figure 16:
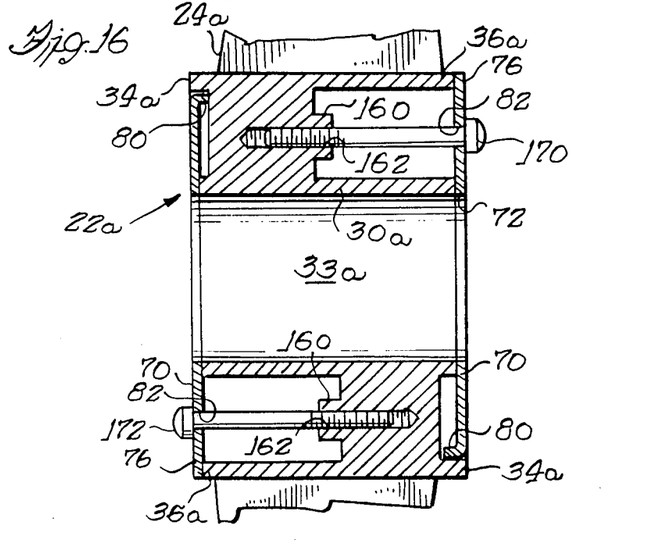
FIG. 16 is a developmental view taken generally along the line 15—15 of FIG. 15 and further illustrating a pair of adapter plates of the type shown in FIGS. 6 and 7 mounted to the wheel hub of FIG. 15.

However, and referring also to FIG. 16, the wheel hub 22a includes additional structure for facilitating the mounting of coaster brake adapter plates of the type illustrated in FIG. 6 and FIG. 7 thereto. In this regard, selected ones of the inner spokes 32a are further provided with integrally molded bosses 160 which carry bores 162 therein for receiving a suitable fastener, for example a threaded screw-type fastener.

In the embodiment illustrated in FIG. 15 and FIG. 16, three of the bosses 160 are arranged with the bores 162 facing one side of the hub 22a and in a symmetrical fashion about the circumference thereof. Three similar bosses 160 are symmetrically arranged about the circumference of the hub 22a with their bores 162 facing in the opposite direction.

Cooperatively, as will be seen with reference again to FIG. 6, the placement of the through apertures 82 in the plates 70 and of these bosses 160 facilitate alignment of three of the through apertures 82 with the three facing bores 162 carried in the bosses 160, without regard for which side of the hub 22a the plate 70 of FIG. 6 and 7 is placed. That is, when the radially outwardly extending portions 76 of the plate 70 are interfitted with the recessed rim portions 34a of the hub 22a, three of the apertures 82 will automatically be aligned with the bores 162 of the three bosses 160 facing that side of the hub 22a. Hence, as illustrated in FIG. 16, suitable fasteners such as threaded screws 170 and 172 may readily be passed through the apertures 82 for threaded engagement with the bores 162. As viewed in FIG. 16, the alignment of the respective apertures 82 and bores 162 is seen to occur with respect to plates 70 placed at both sides of the hub 22a.

Other numbers or arrangements of these bosses 160 and the corresponding through apertures 82 of the plate 70 may of course be utilized without departing from the invention.

Figures 17, 18:
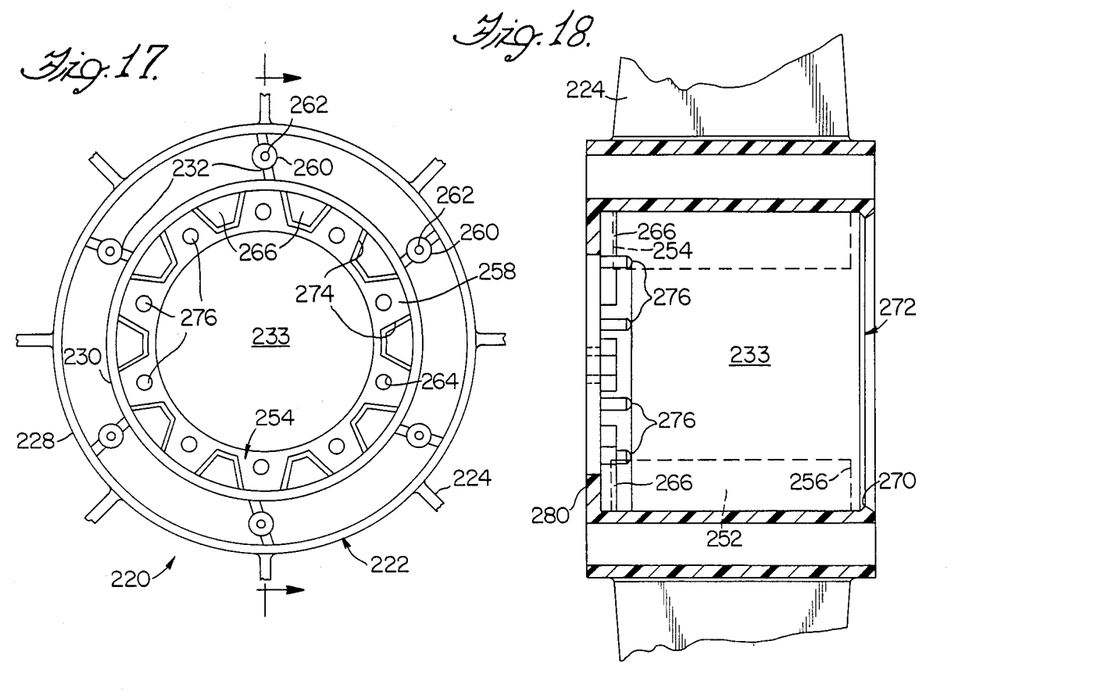
FIG. 17 is a side elevation of wheel hub in accordance with a yet further embodiment of the invention.
FIG. 18 is a sectional view taken generally along the line 18—18 of FIG. 17.

Reference is now invited to FIGS. 17 through 20, wherein further forms of a wheel hub in accordance with the invention are illustrated. Similar to the embodiment of FIG. 1, a wheel 220, which is partially shown in FIGS. 17 and 18, is preferably molded of a plastics material. This wheel 220 includes a central hub portion 222 from which radiate a plurality of spokes 224. The hub 222 includes an outer rim 228 and an inner rim 230. Intermediate these two rims 228 and 230 are a plurality of secondary spokes 232. These spokes 232 may be additionally provided with bosses 260 having through apertures or bores 262, in the same fashion as described for the bosses and bores 160, 162 in FIG. 15. However, the outer rim 228, secondary spokes 232 and bosses 260 may be eliminated, leving but a single rim 230 from which the primary spokes 224 radiate directly, without departing from the invention.

Referring now to inner rim 230 of the hub portion 222, it will be noted that it defines a substantially hollow cylindrical interior or body 233 for receiving an axle or other components or accessories. In particular, the embodiments of FIGS. 17 through 20 is adapted to receive therein a coaster brake assembly designated generally by the reference numeral 250, as best viewed in FIG. 19.

Figures 19, 20:
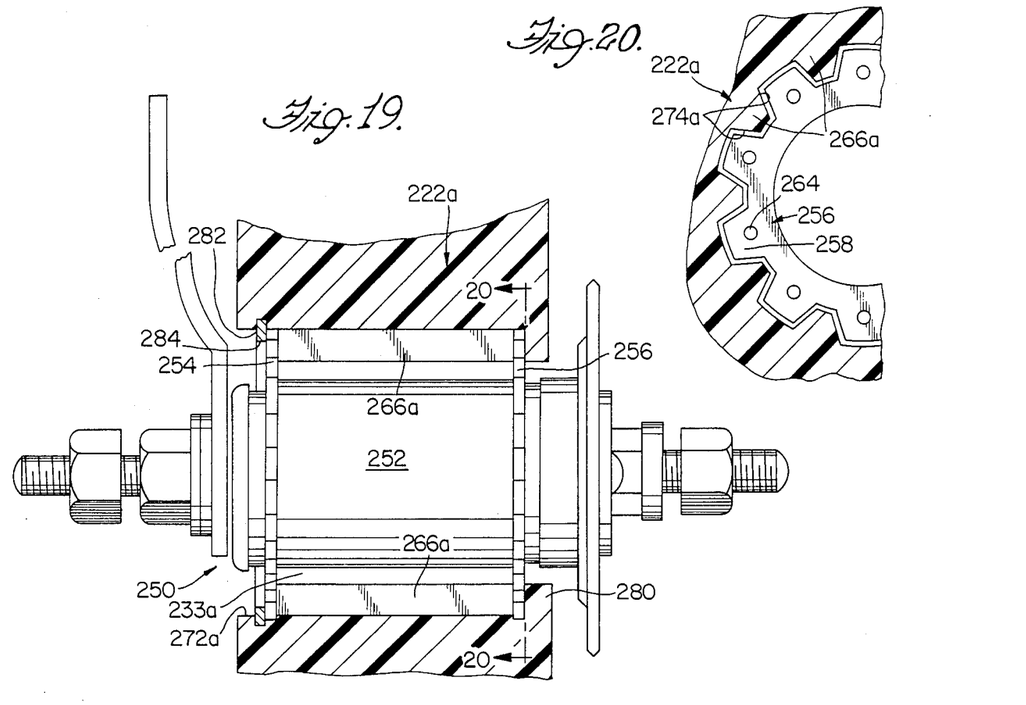
FIG. 19 is a sectional view taken through a wheel hub in accordance with yet further embodiment of the invention in conjunction with a coaster brake assembly to be mounted therein.
FIG. 20 is a partial sectional view taken generally along the line 20—20 of FIG. 19.

This coaster brake assembly 250 comprises a cylindrical housing portion 252 having a pair of axially spaced, substantially identical mounting members 254 and 256 thereon. One of these mounting members 256 is also illustrated in FIGS. 17 and 20 wherein it will be seen to comprise a generally annular member including a plurality of radially outwardly extending and circumferentially spaced projections 258 thereon. Each of the projections 258 also includes a through aperture 264, which receives wire spokes to form a wheel in conventional applications. Such wire spokes are not utilized in the wheel 220 of the invention, however. Cooperatively, the diameter of the hollow cylindrical interior or body 233 of the wheel hub 220 is sufficient to receive the housing 252 and the projections 258 of mounting members 254 and 256 therewithin. In accordance with a feature of the invention, radially acting coupling means are provided in the hollow cylindrical hub body 233 and comprising radially inwardly extending projection means or projecting surfaces 266. These surfaces 266 are formed for complementary engagement intermediate at least one adjacent pair of projections 258 to assure rotation of the mounting members 254, 256 and coaster brake body 252 in unison with the wheel hub 220.

In accordance with a further feature of the invention, axially acting coupling means are also provided for engaging a predetermined portion of the coaster brake assembly for holding the coaster brake assembly substantially against axial movement relative to the wheel hub, once inserted therein. In the embodiment of FIGS. 17 and 18, this axially acting coupling means comprises a radially inwardly extending flange or projection portion or retaining means 270 about an end opening 272 of the hollow hub interior 233. In thi regard, the hub includes this opening 272 in one end thereof for receiving a coaster brake assembly therethrough. Hence, the radially inwardly extending projections 272 are arranged for abutting axially outwardly facing surfaces of the radial projections 258 of one of the end or mounting members 256 of the coaster brake assembly 250. In this regard, the inwardly extending projections or retaining means 272 will be seen to be tapered inwardly somewhat to effect, generally, snappingly engagement over the projections 258 of the coaster brake assembly 250.

In the embodiment of FIGS. 17 and 18, the ridges 266 are equally spaced for interfitting intermediate the spaces define between the projections 258 of at least one of the mounting members 254 and 256. These ridges therefore define recesses 274 therebetween which are generally similarly dimensioned to the projections 258, each recess 274 thereby receiving one projection 258 therewithin. Moreover, the recesses 274 include therein axially extending pins 276, these pins being figured for interfitting within the through apertures 264 of the projections 258. It will be appreciated, however, that the projecting pins 276, as well as the ridges and recesses 266 and 274 may be fewer in number than illustrated without departing from the invention.

In the embodiment of FIGS. 17 and 18, the hollow cylindrical body 233 further includes a generally radially inwardly extending end wall portion 280 at an end thereof opposite open end 272. The ridges 266 comprise a plurality of circumferentially spaced, axially inwardly extending bosses formed on this end wall portion, and defining the recesses 274 therebetween as previously mentioned. Hence, the ridges 266 of FIGS. 17 and 18 interfit with projections 258 only of the mounting member 254 at the one axial end of the hollow cylindrical body 233, as best viewed in FIG. 18.

Referring now to FIGS. 19 and 20, an alternate embodiment of the foregoing structure is illustrated. In FIGS. 19 and 20, the hub is designated 222a and other features similar to those of the embodiment of FIGS. 17 and 18 are designated by similar reference numerals with suffix a. In the embodiment of FIGS. 19 and 20, the raised ridges 266 are designated 266a and will be seen to extend axially across a major portion of the hollow hub and body 233a. Hence, the raised ridges 266a of the embodiment of FIG. 19 interfit with the projections 258 on both end or mounting members 254 and 256. Moreover, the projecting pins 276 are not utilized in the embodiment of FIGS. 19 and 20.

Also, in the embodiment of FIGS. 19 and 20, the axially acting coupling means comprises an undercut, annular groove or recess formed about end opening 272a of the hub. This undercut groove 282 receives a retaining or snap ring member 284, which abuts against an outer surface of mounting member 254 so as to retain the coaster brake 250 within the cylindrical hollow body 233a. Accordingly, snap ring 284 may be interfitted with groove 282 following slideable interfitting of coaster brake 250 into hollow body 233a, with correspondent interfitting of projections 258 with ridges 266a.

It will be seen from the foregoing that in the embodiment of FIGS. 17 and 18, the wheel hub hollow cylindrical body 233, radially acting coupling means and axially acting coupling means comprise a one-piece integrally formed structure. In the embodiment of FIGS. 19 and 20, only the additional snap-ring 284 is utilized in order to accommodate the mounting of coaster, 250 the wheel hub 222a.

While the invention has been illustrated and described herein with reference to preferred embodiments, the invention is not limited thereto. Those skilled in the art may devise various changes, alternatives, and modifications upon reading the foregoing descriptions. The invention includes such changes, alternatives and modifications insofar as they fall within the spirit and scope of the appended claims.

The invention is claimed as follows:

1. A wheel hub having an improved structure for mounting at least one accessory thereto, said wheel hub comprising: a hollow cylindrical body; radially acting coupling means including a plurality of alternating recesses and ridges formed interiorly of said hollow body for complementary engagement with a portion of said accessory for rotation in unison with said wheel hub; and axially acting coupling means for holding said accessory substantially against axial movement relative to said wheel hub; wherein said hollow cylindrical body has an internal diameter at least as great as the maximum radial extent of said accessory for receiving said accessory therewithin and further includes an opening in at least one end thereof for receiving said accessory therethrough; and wherein said axially acting coupling means comprises radially inwardly extending retaining means about said opening for snappingly engaging over an axially outwardly facing surface portion of said accessory.

2. A wheel hub according to claim 1 wherein said hollow cylindrical body has a radially inwardly extending end wall portion at an end thereof opposite said opening comprising a further portion of said axially acting coupling means and wherein said alternating recesses and ridges comprise a plurality of circumferentially spaced, axially inwardly extending bosses formed on said end wall portion and defining said recesses therebetween.

3. A wheel hub according to claim 2 and further including a plurality of axially inwardly extending pins located in at least selected ones of said recesses.

4. A wheel hub according to claim 1 wherein said hollow cylindrical body, said radially acting coupling means and said shoulder means comprise a one-piece, integrally formed structure.

5. A wheel hub having an improved structure, said wheel hub comprising: a hollow cylindrical body, radially acting coupling means including a plurality of alternating recesses and ridges formed interiorly of said hollow body for complementary engagement with a portion of said accessory for rotation in unison with said wheel hub; and axially acting coupling means for holding said accessory substantially against axial movement relative to said wheel hub wherein said hollow cylindrical body further includes a radially inwardly extending end wall portion at one end thereof comprising a portion of said axially acting coupling means, and wherein said alternating recesses and ridges comprise a plurality of circumferentially spaced axially inwardly extending bosses formed on said end wall portion and defining said recesses therebetween.

6. A wheel hub according to claim 5 and further including a plurality of axially inwardly extending pins located in at least selected ones of said recesses.

7. Apparatus according to claim 6 wherein said bosses and said recesses are dimensioned and located for complementary interfitting with a plurality of raidally spaced, axially outwardly extending projections of a coaster brake assembly comprising said accessory.

8. A wheel hub according to claim 7 wherein said projections of said coaster brake assembly have through apertures and wherein said pins are located and dimensioned for interfitting through at least selected ones of said through apertures.

9. A wheel hub according to claim 5 wherein said bosses extend axially over a minor fractional portion of said hollow tube interior.

10. A wheel hub having an improved structure for mounting at least one accessory thereto, said wheel hub comprising: a hollow cylindrical body; radially acting coupling means including a plurality of alternating recesses and ridges formed interiorly of said hollow body for complementary engagement with a portion of said accessory for rotation in unison with said wheel hub; and axially acting coupling means for holding said accessory substantially against axial movement relative to said wheel hub; wherein said hollow cylindrical body has an internal diameter at least as great as the maximum radial extent of said accessory for receiving said accessory therewithin and further includes an opening in at least one end thereof for receiving said accessory therethrough, and wherein said bosses extend axially over a major fractional portion of said hollow hub interior.

11. A wheel hub including an improved structure for mounting at least one accessory thereto, said wheel hub comprising: a hollow cylindrical body; radially acting coupling means including a plurality of alternating recesses and ridges formed interiorly of said hollow body for complementary engagement with a portion of said accessory for rotation in unison with said wheel hub; and axially coupling means for holding said accessory substantially against axial movement relative to said wheel hub; wherein said hollow cylindrical body, said radially acting coupling means and said axially acting coupling means comprise a one-piece, integrally formed structure.

12. A wheel hub including an improved structure for mounting at least one accessory thereto, said wheel hub comprising: a hollow cylindrical body; radially acting coupling means including a plurality of alternating recesses and ridges formed interiorly of said hollow body for complementary engagement with a portion of said accessory for rotation in unison with said wheel hub; and axially acting coupling means for holding said accessory substantially against axial movement relative to said wheel hub; wherein said hollow cylindrical body has an internal diameter at least as great as the maximum radial extent of said accessory for receiving said accessory therewithin and further includes an opening in at least one end thereof for receiving therethrough; and wherein said axially acting coupling means comprises an annular recess about said opening and a snap ring engageable with said recess for abutting an axially outwardly facing surface portion of said accessory for retaining said accessory within said hollow body.

13. A wheel hub structure for mounting a coaster brake within a wheel hub, said coaster brake including a cylindrical housing portion having a pair of axially spaced mounting members thereon, each of said mounting members including a plurality of radially outwardly extending and circumferentially spaced projections thereon; said wheel hub structure comprising a hollow cylindrical body of a diameter sufficient to receive said housing and said projections therewithin; radially acting coupling means in said hub body comprising radially inwardly extending projection means for complementary engagement intermediate at least an adjacent pair of said projections for rotation of said coaster brake housing in unison with said wheel hub; and axially acting coupling means for engaging a predetermined portion of said coaster brake assembly for holding said coaster brake assembly substantially against axial movement relative to said wheel hub.

14. A wheel hub according to claim 13 wherein said hollow cylindrical body includes an opening in at least one end thereof for receiving said coaster brake assembly therethrough; and wherein said axially acting coupling means comprises radially inwardly extending retaining means, about at least a portion of said opening for abutting axially outwardly facing surfaces of at least selected ones of the radial projections at one end of said coaster brake housing.

15. A wheel hub according to claim 13 wherein said inwardly extending retaining means comprises a shoulder portion formed integrally with said hollow cylindrical body for snappingly engaging over said axially outwardly facing surfaces of said selected ones of the radial projections at one end of said coaster brake housing.

16. A wheel hub according to claim 15 wherein said hollow cylindrical body, said radially acting coupling means and said axially acting coupling means comprise a one-piece, integrally formed structure.

17. A wheel hub according to claim 13 wherein said retaining means comprises an annular recess about said opening and a snap ring engageable with said recess for abutting said axially outwardly facing surfaces of said selected ones of the radial projections of said coaster brake at one end of said coaster brake housing.

* * * * *